US010255177B2

United States Patent
Kan et al.

(10) Patent No.: US 10,255,177 B2
(45) Date of Patent: Apr. 9, 2019

(54) SYSTEM AND METHOD FOR ADAPTIVE OPTIMIZATION FOR PERFORMANCE IN SOLID STATE DRIVES BASED ON READ/WRITE INTENSITY

(71) Applicant: Dell Products, LP, Round Rock, TX (US)

(72) Inventors: Lip Vui Kan, Hillbrooks (SG); Young Hwan Jang, Gyeonggi-do (KR)

(73) Assignee: Dell Products, LP, Round Rock, TX (US)

( * ) Notice: Subject to any disclaimer, the term of this patent is extended or adjusted under 35 U.S.C. 154(b) by 134 days.

(21) Appl. No.: 15/289,866

(22) Filed: Oct. 10, 2016

(65) Prior Publication Data
US 2018/0101477 A1  Apr. 12, 2018

(51) Int. Cl.
*G06F 12/0888* (2016.01)
*G06F 12/02* (2006.01)

(52) U.S. Cl.
CPC .. *G06F 12/0246* (2013.01); *G06F 2212/1024* (2013.01); *G06F 2212/214* (2013.01); *G06F 2212/7201* (2013.01); *G06F 2212/7203* (2013.01); *G06F 2212/7204* (2013.01)

(58) Field of Classification Search
CPC .. G06F 12/0888; G06F 3/0613; G06F 3/0659; G06F 3/0685; G06F 12/1009
See application file for complete search history.

(56) References Cited

U.S. PATENT DOCUMENTS

2010/0174853 A1*  7/2010  Lee ................... G06F 12/0246
                                              711/103

OTHER PUBLICATIONS

Shim, Hyotaek; Seo, Bon-Keun; Kim, Jin-Soo; Maeng, Seungryoul; An Adaptive Partitioning Scheme for DRAM-based Cache in Solid State Drives; 2010, IEEE, accessed from: http://storageconference.us/2010/Papers/MSST/Shim.pdf (Year: 2010).*

* cited by examiner

*Primary Examiner* — Reginald G Bragdon
*Assistant Examiner* — Edward Wang
(74) *Attorney, Agent, or Firm* — Prol Intellectual Property Law, PLLC; H. Kenneth Prol (57) ABSTRACT

A method and information handling system and having a solid state drive (SSD) memory device including NAND flash memory with an SSD controller to execute instructions of an SSD adaptive profiling engine for RAM cache optimization and configured to cache a partial FTL table in RAM including look-up addresses corresponding to LBA segments in the NAND flash memory having access counts reflecting SSD I/O operations. The method and system further configured to determine whether the SSD memory device operation is write intensive (or read intensive) from assessment of stored read access counts and write access counts and further determine whether to load a partial FTL table into RAM cache and use remaining unoccupied RAM space for a data cache to enhance the SSD memory device operations.

20 Claims, 6 Drawing Sheets

SYSTEM AND METHOD FOR ADAPTIVE OPTIMIZATION FOR PERFORMANCE IN SOLID STATE DRIVES BASED ON READ/WRITE INTENSITY

CROSS REFERENCE TO RELATED APPLICATIONS

Related subject matter is contained in co-pending U.S. application Ser. No. 15/273,573, filed Sep. 22, 2016, entitled "System and Method for Adaptive Optimization for Performance in Solid State Drives Based on Segment Access Frequency," invented by Lip Vui Kan et al., and assigned to the assignee hereof.

FIELD OF THE DISCLOSURE

The present disclosure generally relates to information handling systems, and more particularly relates to management of operation for solid state drives (SSD) used with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include various types of memory such as random access memory (RAM), ROM, flash memory of a variety of types and/or other types of nonvolatile memory. Information handling system may also include one or more processing resources such as a central processing unit (CPU) or hardware or software control logic, various controllers and the like. Additional components of the information handling system may include one or more disk drives, one or more network ports for communicating with external devices as well as various input and output (I/O) devices, such as a keyboard, a mouse, touch screen and/or a video display. Controllers and drivers may also assist in operation of any of the additional components. In an aspect, one or more disk drives or other storage may include solid state drives such as NAND-based flash drives, NOR-based flash drives, DRAM based memory or similar variations as understood in the art. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The performance of solid state drives (SSD) used with information handling systems (IHS) can vary and even degrade over time. An SSD may be comprised of several components including a microcontroller, a DRAM, and some type of non-volatile memory. The non-volatile memory may include NAND flash memory and consist of several NAND flash memory packages used together to provide substantial memory capacity in some embodiments. Flash memory packages may be subject to a finite lifespan of operation thus resulting in wear to the NAND blocks. SSD devices may use various strategies in operation to extend endurance. One of these is wear leveling which includes address indirection using flash translation layer (FTL) tables to link logical block address requests for a memory location with a physical address in the NAND flash. This logical-to-physical address translation may enable a rotation of physical NAND flash locations to be used. Quick access to an FTL table may be required to facilitate expedient logical-to-physical address translation, so in some embodiments the SSD device may cache some or all of the FTL table in DRAM or other RAM as explained below.

Further SSD are subject to performance variations. Some performance variation may occur with respect to rates of writing data or programming into non-volatile memory of SSD, as well as reading data. Several strategies may be used with SSD to improve performance as well as maximize utilization of the blocks of SSD memory. The DRAM cache associated with the SSD device, or other RAM, may be used as a data cache since RAM may respond more quickly than NAND or NOR flash memory. Further details are described herein. SSD memory may be a NAND or NOR non-volatile memory type in various embodiments. It is understood that some of the concepts disclosed herein may be applied to either NAND or NOR or variations of these types of non-volatile memory. For purposes of illustration, embodiments herein are described for NAND solid state drives but may variously be applied to other types of non-volatile memory by those of skill in the art.

In the present disclosure, various embodiments are described for an SSD adaptive profiling engine for LBA segments to RAM caching optimization for FTL table storage or for data caching for the SSD general I/O operations. In one aspect, the system or methods disclosed in embodiments herein may determine whether a full FTL table should be cached or whether portions of the memory and LBA segments are not frequently accessed such that only a partial FTL table need be cached. In another aspect of the system or methods of the embodiments of the present disclosure, the SSD controller or another processor may determine I/O access history for LBA segments to determine frequency of usage and whether and how many LBA segment look-up addresses should be available in cache for quick access during I/O operations with the SSD. Additionally, the SSD controller or other processor may also determine type of I/O access for LBA segments and track how many of each type of SSD I/O access operation is received such as tracking how many SSD read I/O accesses and how many SSD write I/O accesses are received at the SSD memory device. The SSD controller monitors the total number of read and write operations in the lifetime of the SSD memory device or over a defined period or number of received I/O accesses. This information can be used to determine if the SSD memory drive is utilized in a read intensive way or write intensive way in an example embodiment.

A threshold level of read operations or write operations relative to the other or to the total number of SSD I/O operations may be used to determine read intensive or write intensive activity in an aspect of some embodiments of the present disclosure. In the event that the SSD memory device is used in a read intensive way, the full FTL table is loaded and the drive operates as normal. In the event that the drive is used in a write intensive application, the FTL table is loaded partially leaving a greater amount of RAM space available for other purposes. In an example embodiment, the freed up area in DRAM can be used for data staging of write commands, and this would speed up command latency significantly for the SSD memory device. The moment data is written into the DRAM cache, the SSD could proceed to flag completion of the write command to the host. This has the potential to improve command latency in the order of hundreds of times. When the drive reaches an idle period, the data is immediately flushed into flash memory locations corresponding to the LBA segment addresses.

In some aspects, the size of the partial FTL table loaded into RAM cache during write intensive operation can be determined dynamically by monitoring user behavior in terms of data locality, which is the subject matter covered in the related application Ser. No. 15/273,573. Related application Ser. No. 15/273,573, which is incorporated herein by reference, teaches other aspects of embodiments of the present disclosure. For example, determination of outlier LBA segments may be analyzed to determine if usage has fallen below a level to justify caching of corresponding look-up addresses via a partial FTL table in cache. In further aspects, the system and methods of embodiments of the present disclosure may determine whether an expansion of the partial FTL table is warranted to include one or more additional LBA segment look-up addresses being used within a threshold frequency. In yet other aspect, partial DRAM or other RAM availability for data caching may be used in SSD I/O operation to enhance responsiveness and speed of SSD operation. For example, in an embodiment, pre-fetching data from a NAND or NOR flash may be stored in a DRAM pre-fetch cache to enhance responsiveness of the SSD to the host system. Algorithms for conducting the SSD adaptive profiling and RAM memory allocation and usage are described in various embodiments herein.

Figure 1:
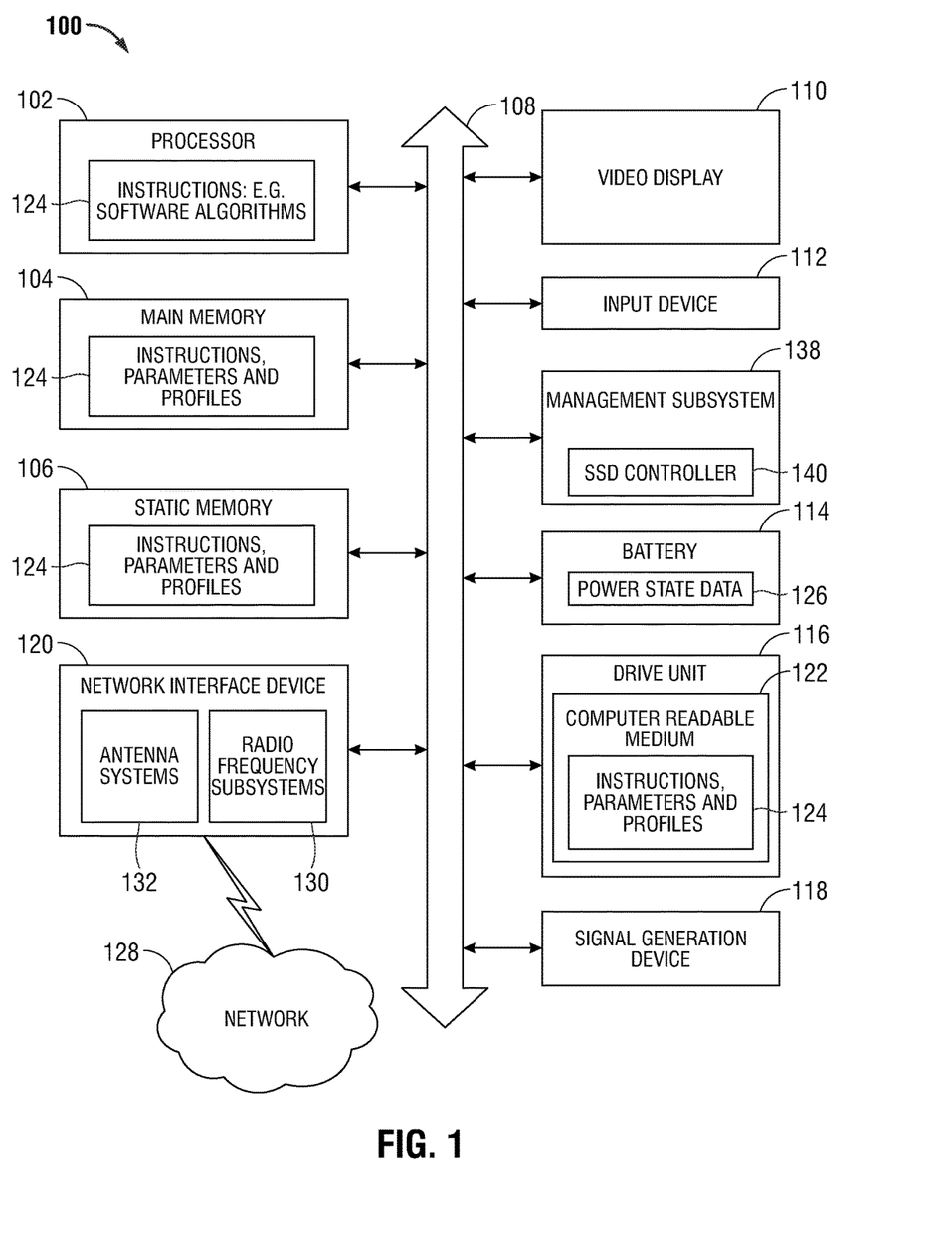
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the host information handling systems such tablet computer, laptop computers, smart phone systems, other mobile computing devices, servers or systems such as located anywhere within a network, including a remote data center operating virtual machine applications. The information handling system 100 may also execute code 124 for instructions and algorithms such as an operating system and applications that may operate on servers or systems, remote data centers, or on-box in individual client information handling systems such as according to various embodiments herein.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Static memory 106 or drive unit 116 or both may include various types of solid state memory as understood in the art. This may include NAND flash or NOR flash memory types or some combination of both used with the solid state drive (SSD) systems and static memory systems described in embodiments herein. Information handling system 100 may serve as one or more host devices interfacing with main memory 104, static memory 106, or drive unit 116. As an example, the SSD may further include an SSD controller 140 with onboard logic for controlling memory drive operations as well as a flash controller component for controlling one or more the flash memory packages. The SSD system or any SSD controller logic 140 may further include on-board SRAM as well as additional DRAM for caching or other purposes as described further herein. It is understood that an SSD controller, flash controller, and any SRAM or DRAM may in some instances be integrated on one or any number of integrated circuit chips. An SSD system and SSD controller logic 140 may be a microcontroller or other controller may be capable of administering some portion or all of each of the specific embodiments of the present disclosure. SSD system and SSD controller 140 may execute code instructions for an SSD adaptive profiling engine as described in embodiments herein for example.

The information handling system 100 may serve as one or more host devices for the SSD interfacing with main memory 104, static memory 106, or drive unit 116 and connecting via host interface logic as is described in some embodiments herein. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform parts of any one or more of the methods or computer based functions disclosed herein. In other aspects, a management subsystem 138 may include one or more controller circuits, such as SSD controller 140 which may execute a set of instructions 124 (shown with respect to drive unit 116) that is hard wired, firmware, or software logic implemented to perform any portion of one or more of the methods or systems disclosed in embodiments herein including address indirection, execution of SSD I/O operations, execution of an adaptive profiling engine, and execution of data cache utilization for write caching, pre-fetching or other purposes as described herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), software or BIOS/FW code may reside in another storage medium of information handling system 100. For example, software or firmware code can reside in static memory 106, drive 116, in a ROM (not illustrated) associated with information handling system 100 or other memory. In other aspects, application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Software application programs 124 and BIOS/FW code 124 can each be implemented as single programs, or as separate programs carrying out the various features as described herein. Application program interfaces (APIs) such Win 32 API may enable application programs 124 to interact or integrate operations with one another.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The information handling system may also have a management subsystem 138 with a plurality of information handling system subsystems for control of a plurality of systems. For example, management subsystem 138 may interface with a variety of controllers to execute policy or enable operation of various information handling subsystems. In an example embodiment, an SSD controller 140 may access other elements such as drive unit 140 or static memory 106 shown in FIG. 1, for example, via one or more buses 108. In some aspects, system-level operation or component-level operation can be managed via the management subsystem 138.

Static memory 106 or drive unit 116 may also be managed by a management subsystem 138 that may operate one or more controllers including an SSD controller 140 in an example embodiment. The SSD controller 140 may contain or access code instructions in firmware, software, or may be hard coded to execute instructions to perform any one or more of the methods or computer based functions disclosed herein. For example, information handling system 100 includes one or more sets of firmware code instructions used with the SSD controller to operate the SSD adaptive profiling engine and the various aspects of solid state drive operation including address indirection, wear-leveling, SSD I/O operations for program and read operations of data, invalidation, buffer type switching, garbage collection, write acceleration, a buffer switch counter, among other functions associated with operation of flash memory or a flash drive.

The information handling system may include a power source such as battery 114 or an A/C power source. Battery 114 may include a smart battery system that tracks and provides power state data 126.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In some embodiments, dedicated hardware implementations such as application specific integrated circuits (ASIC), programmable logic arrays (FPGA) and other hardware devices can be constructed to operate as SSD controllers to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an ASIC or an FPGA. Accordingly, the present system encompasses software, firmware, and hardware implementations.

In accordance with various embodiments of the present disclosure, the methods described herein may be implemented by firmware executed by one or more controllers or by software programs executable by a computer system. Further, in an exemplary, non-limited embodiment, implementations can include distributed processing, component/object distributed processing, and parallel processing.

Figure 2:
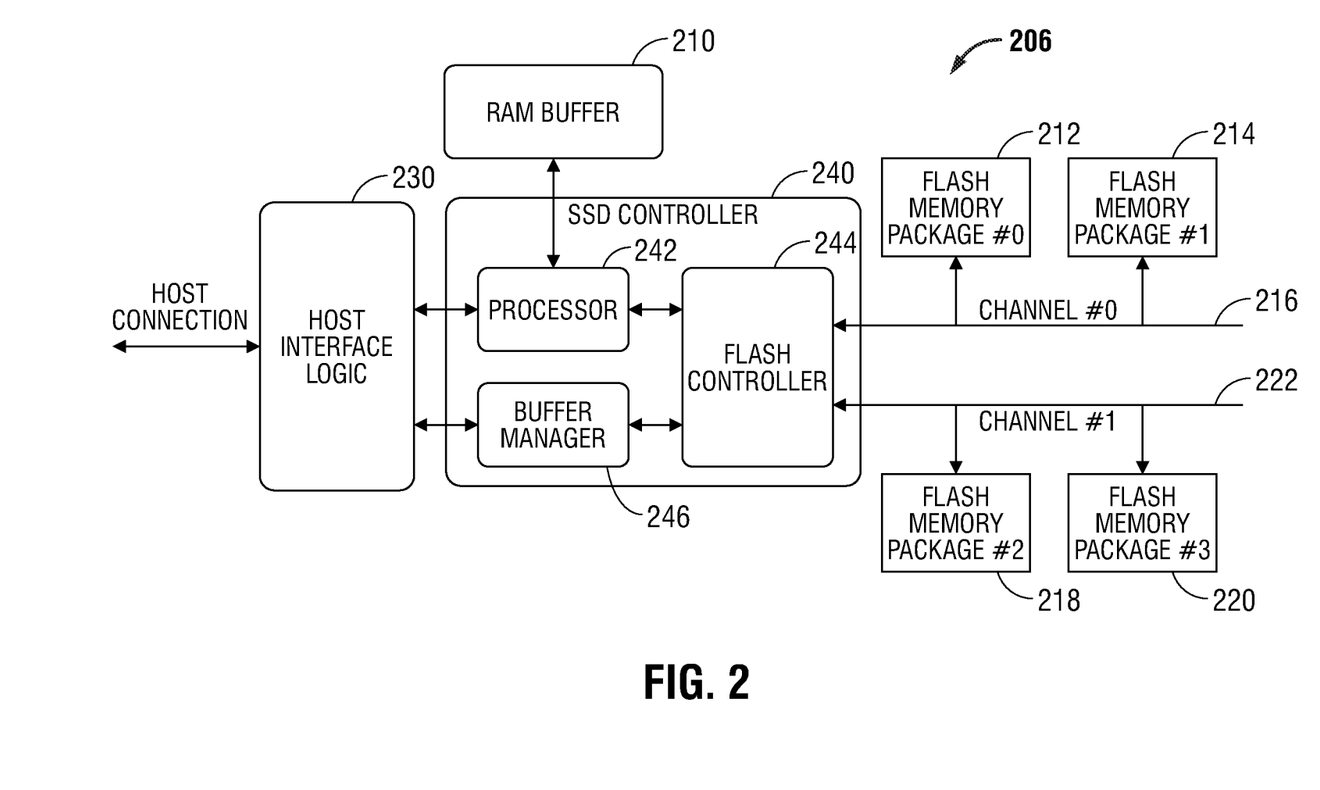
FIG. 2 is a block diagram illustrating a solid state drive (SSD) with RAM buffer according to an embodiment of the present disclosure.

FIG. 2 shows an example architecture for a solid state drive (SSD) 200 according to one embodiment of the present disclosure. SSD 200 includes an SSD controller 240 having several components. Not all components of an SSD 200 and SSD controller 240 may be shown, but for purposes of illustration, relevant components are set forth in FIG. 2. SSD controller 240 includes a processor 242 that may execute various processes including management of several SSD functions including address indirection, caching, buffering via a buffer manager 246, wear leveling, garbage collection, and other aspects of executing or improving SSD I/O operations including program writes and reads of data into flash memory received from a host device. Several example operations are listed herein and additional operation is understood by those of skill for implementation of a functional SSD 200. SSD controller 240 may include an onboard SRAM (not shown) for various functions described above and additionally may be operatively connected to a DRAM or RAM buffer 210. DRAM 210 may be an integrated DRAM or may be an DRAM circuit external to SSD controller 240. DRAM 210 may be used for a variety of operations including for caching FTL tables for expedient address indirection as well as used to cache pre-fetched data to expedite responsiveness of the SSD 200 to a host information handling system according to embodiments describe herein.

In another aspect, SSD controller 240 may include or be operatively coupled to a flash controller 244 which may be used to interface with and operate program, read, erase, and other operations with the NAND or NOR flash memory arrays. In the example embodiment, flash controller 244 of the SSD controller 240 interfaces with flash memory package #0 212 and flash memory package #1 214 via channel #0 216. In the example embodiment, flash controller 244 of the SSD controller 240 interfaces with flash memory package #2 218 and flash memory package #3 2220 via channel #1 222. It is understood, that many more channels and packages may be implemented and that the arrangement of flash packages on channels for communications may occur in a variety of architectures. The present architecture in the embodiment examples shown in FIG. 2 is set forth for illustrative purposes and is not meant to be a limiting architecture. For example, more than two flash packages may be linked via each communication channel 216 and 222 with the SSD flash controller 244. Further, assignment numbering of flash packages across channels may be in a variety of ordering to implement available efficiencies for program or read I/O operations as understood in the art.

Additionally, SSD 200 and SSD controller 240 may be operatively connected to a host information handling system, such as 100 described above in FIG. 1, via a host interface logic 230. Host interface logic 230 may be adaptable to accommodate bus communications with the SSD 200 via a variety of bus standards understood in the art. The host interface logic 230 adapts to the bus communication protocol (e.g., PCIe, SATA, SCSI, USB, etc.) of a host system as well as operation with host software drivers for SSD such as NVMe. It is understood that host interface logic 230 adheres interface with the SSD to the standards of operation associated with one or more of those protocols or standards. Examples of standard of interface operation may include implementation of NAND flash interface standards in an example embodiment such as Open NAND Flash Interface specifications (ONFI) or JEDEC related specifications for interface operations with NAND flash.

Figure 3:
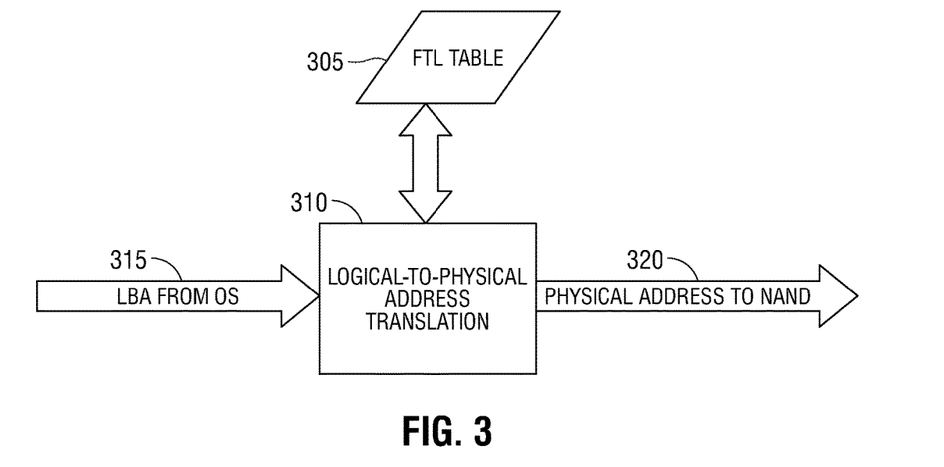
FIG. 3 is a graphic block diagram illustrating aspect of operation of a flash transition layer (FTL) table with an SSD memory according to an embodiment of the present disclosure.

FIG. 3 shows the operation of logical-to-physical address translation 310 via an FTL table 305 according to an example embodiment. As explained above, flash memory packages may be subject to wear with usage for SSD I/O operations including programming, reads, and erase operations. The SSD devices may use address indirection for purposes of implementing wear-leveling as well as for reasons related to legacy operation of data communications with a host information handling system. Memory programming and read operations with many host information handling systems operate with respect to legacy memory or drive operations used for magnetic disk systems. This includes I/O operations of a program or read function to a logical block address (LBA) from the host operating system as shown at 315. The SSD controller executes logical-to-physical address translation 310 via an FTL table 305 to link logical block address requests for a memory location with a physical address in the NAND flash (or another type of non-volatile memory). A copy of the full FTL table is stored in the non-volatile memory. Quick access to an FTL table may be required to facilitate expedient logical-to-physical address translation, so in some embodiments the SSD device may cache some or all of the FTL table in DRAM or other RAM as explained below. DRAM responsiveness from a cached FTL would be faster than access to the FTL table stored in non-volatile memory such as NAND flash memory.

The address indirection for logical-to-physical address translation 310 of the present embodiment utilizes the FTL table 305 which is a look up table that re-directs a logical block address (LBA) received from the operating system 315 of a host information handling system to the physical address in flash memory 320 where the data is actually stored or to be stored. To expedite access via a cached FTL table 305, the FTL table stored in flash is loaded entirely or in part into DRAM when the SSD powers up in some embodiments. In an aspect of an example embodiment, 1 MB is typically required to store the FTL table housing look-up addresses, metadata, and other data related to address indirection pertaining to indexing 1 GB of physical addresses of flash memory. In one embodiment, a 512 GB SSD may utilize 512 MB DRAM capacity to house an FTL table.

It has been determined that in many information handling systems, such as those operating Windows based operating systems, the data span, also referred to the data locality, utilized by the information handling system host may be a narrower window than the entirety of an SSD flash memory. In an example, it has been that data locality of a typical Windows® based information handling system is often confined to an 8 GB span. This data locality of the information handling system may often be limited to half or less of the SSD flash memory capacity. In a circumstance where the data locality is a narrower window of SSD flash memory capacity usage, a partially loaded FTL table may generate a sufficiently high hit rate to sustain SSD I/O operations with very little impact on data throughput performance of the SSD. Devoting the full capacity of the DRAM to storing a full FTL table during address indirection may be wasteful and unnecessary in some circumstances. For example, if an SSD memory device operates with write-intensive operation, the likelihood of an FTL table cache miss causing delay is lower due, in some cases, to control over where to write the data and due to predictable write data locality span. Thus a partially loaded FTL table into cache may be beneficial. With a partially loaded FTL table, remaining DRAM capacity may be dedicated to other purposes for improvement of the SSD device responsiveness and throughput and reduce SSD command latencies. In one example embodiment, the freed DRAM capacity may be used for write caching to enable an SSD memory device to write an incoming I/O write access to DRAM with greater speed and report a completed I/O write operation back to a host. Then, when the SSD memory device is idle, the DRAM may be flushed so that the SSD I/O write command data is transferred from DRAM cache to a physical flash memory location associated with an LBA segment address for the write instructions. This is discussed further in embodiments below. In another example, pre-fetching may be used from the SSD flash packages to the DRAM to provide faster responses to read requests from an OS. A pre-fetching or other algorithm for programming or reads from SSD may be implemented in the storage driver for caching data to accelerate the storage performance.

In an example embodiment, if the data locality span may be limited to an 8 GB span, a partially loaded FTL table of 24 MB is sufficient to generate a high FTL cache hit ratio such that throughput performance is not impacted. It is noted that for Windows based information handling systems, 8-10 GB of span is a typical data locality for many levels of operation. However, fixing a partial FTL table caching level to a specifically smaller FTL table may be inflexible in light of a wide variety of usage scenarios likely for a general purpose information handling system, for example one with a Windows-based OS. Certain applications may require large amounts of data access in the SSD device. When operating in some usage scenarios, the data locality span may increase significantly from, for example an 8 GB span. Hence, a flexible FTL table caching optimization method may be used. An adaptive profiling engine implemented in software, firmware, hard-coded or any combination of the same may be used to monitor data read to write ratios for an information handling system interfacing with an SSD device in an example embodiment. The adaptive profiling engine may adaptively determine to load either a full or partial FTL table depending on the whether the usage is read intensive or write intensive. When a partial FTL table is cached during write intensive operation, the size of the partial FTL table stored in cache may be monitored maintain a high cache hit ratio for the partial FTL table for the minority of read operation still conducted. Caching only a partial FTL table for write intensive operation will free a portion of the DRAM space for assisting the SSD I/O operational efficiency. In a particular embodiment, the freed DRAM space may be used to improve write I/O operations.

In other aspects however, an FTL table cache miss on a partially cached FTL table requires greater latency to access the full FTL table stored in flash. This may be problematic and detrimentally impact the SSD memory device responsiveness by increasing latency. Thus, in some circumstances caching a full FTL table may be preferable. In an example embodiment, an SSD memory device that typically is subject to read-intensive operation may not benefit as readily from a partial FTL table in cache and a full FTL table in cache may be preferable to avoid FTL table cache misses during incoming read I/O operations from the host or hosts.

Figure 4:
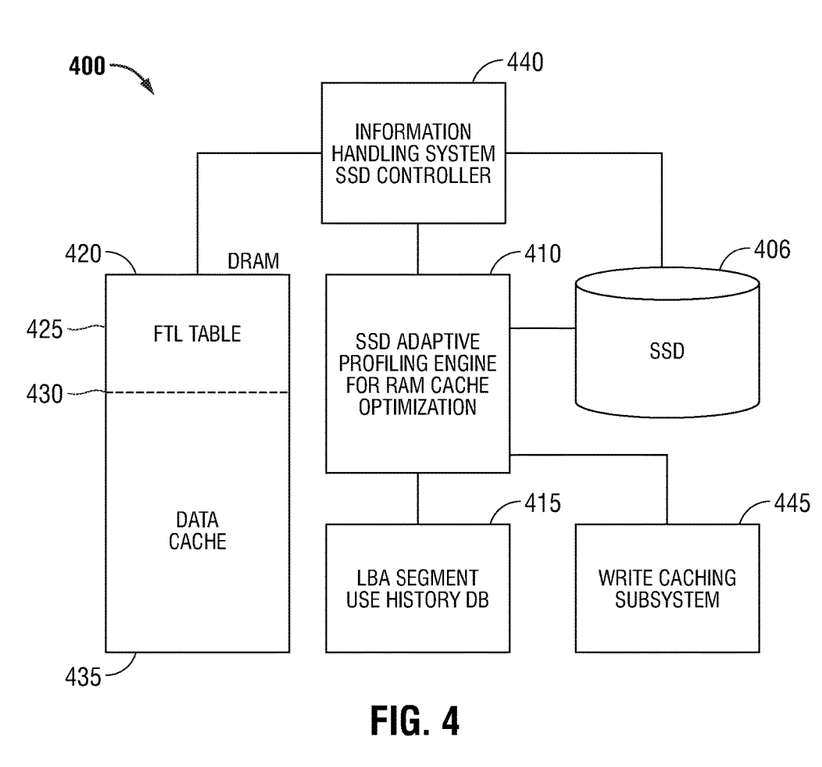
FIG. 4 is a block diagram illustrating aspects of an SSD memory device operating with an SSD adaptive profiling engine for RAM caching optimization according to an embodiment of the present disclosure.

FIG. 4 is a block diagram illustrating components for an aspect of the SSD adaptive profiling engine 410 for dynamic optimization of DRAM 420 usage according to an embodiment of the present disclosure. SSD controller 440 works in association with drivers in an information handling system host (not shown) to manage operation of the SSD device. SSD controller 440 may execute code instructions or hardwired instructions for implementing SSD I/O operations. SSD controller 440 may also execute code instructions or hardwired instructions to support SSD operation including addressing, program and read operations, invalidation, buffer type switching, garbage collection, write acceleration, wear balancing or the like.

DRAM 420 may be used for caching for all or a partial FTL table 425. In an example embodiment, a partial FTL table 425 may be cached in DRAM 420 occupying a portion of the DRAM up to 430. The remainder of DRAM 420 may be used as a data cache 435 to support various aspects of solid state drive I/O operations. In particular, SSD I/O operations of programming and read operations may be assisted by caching some data to be throughput in DRAM 420.

In one aspect of the present disclosure, the SSD adaptive profiling engine 410 may determine whether I/O operations are write intensive or read intensive. This may be done for example by assessing the ratio of recorded incoming read I/O accesses to write I/O accesses. As explained herein, during write operations the SSD has control over which physical address in flash memory to write the data into. Accordingly, a full FTL table is not necessary when SSD memory device operation is determined to be write intensive. A partial FTL table may be used instead. For a read I/O access, physical address must be indexed from the FTL table using the incoming LBA. The incoming LBA may be random, thus an FTL cache miss will require accessing the FTL table portions not in RAM cache. These are typically stored in flash memory, thus latency is increased by a slower access of these LBA look up addresses for address translation. For read intensive operation of an SSD memory device, a full FTL table loaded in DRAM cache may thus be more efficient to ensure speedy address translation without risk of FTL table cache misses.

In an example embodiment, RAM data cache 435 (e.g., DRAM or SRAM) may be used with a write caching subsystem 445. Write caching subsystem 445 may work to permit the SSD controller 440 to conduct SSD write operations to the RAM data cache 435 when a program or write I/O operation is received according to some embodiments. The SSD controller 440 can report the write I/O operation as completed while the write I/O data is stored in the RAM data cache 435 to improve response times to the host. Then when the SSD is idle at a later time, the write I/O data stored in data cache 435 may be flushed to the SSD flash memory 406. In at least one example embodiment, the write caching subsystem 445 may be implemented in a storage driver of the SSD memory device. Such an activity will expedite the SSD device responsiveness to a host information handling system without waiting for addressing the flash memory 406 which may be slower than storing in a DRAM data cache as can be appreciated.

The SSD adaptive profiling engine 410 may operate to monitor the ratio of incoming read I/O operations to write I/O operations. Determination of read intensive or write intensive operation may assist in determining whether to load a full or partial FTL table into cache as described herein. Nonetheless, both types of SSD I/O operations may still be received. For example, although the SSD operation may be write intensive, read I/O operations will still be conducted. The adaptive profiling engine may further track the size of a data locality span of the host I/O accesses to the SSD memory device in some embodiments. Thus, the SSD adaptive profiling engine 410 may also work to keep the FTL table hit rate high from DRAM cache 420 by adaptively determining what portion of the FTL table 425 or how much of the FTL table 425 should be stored in DRAM 420. In some embodiments, the SSD adaptive profiling engine 410 may adaptively adjust the size of a partial FTL table providing for address translation with a high hit FTL table cache ratio as described in related application Ser. No. 15/273,573 to the same inventors. Moreover, the adaptive profiling engine 410 may monitor LBA segment usage with cached LBA segment address to evict infrequently accessed LBA segments from the partial FTL table if necessary in some aspects as described in the related application.

According to some embodiments, the adaptive profiling engine 410 may monitor write or read access counts to establish the ratios of the types of incoming SSD I/O operations from the host in accordance with disclosures herein. Maintaining such counts of incoming read I/O operations and write I/O operations may be conducted in association with maintaining incremented LBA segment access counts. Access counts, including information on numbers of read access counts and write access counts, may be maintained in an LBA segment use history database 415.

The LBA segment use history database 415, including the historic data locality span, may be updated at various points of operation of the SSD adaptive profile engine according to some embodiments. In one aspect, updating the LBA segment use history database 415 may occur after I/O operations. In another aspect, the LBA segment use history database 415 may be updated upon shutdown, or at other points.

Ongoing access counts for LBA segment I/O accesses may also be tracked in a session data locality span file (not shown) during a session of SSD memory device operation in some aspects. The session data locality span may be stored in a local buffer or in another location accessible by the SSD controller during operation. The session data locality span may then be used to update the LBA segment use history database 415 in some embodiments.

The SSD controller 440 may be linked along with SSD flash memory 406 to a host information handling system (not shown). SSD flash memory 406 may be comprised of a plurality of flash memory packages operatively coupled to SSD controller 440 via one or more channels according to an embodiment of the present disclosure. The information handling system SSD controller 440 may execute firmware code, in one example embodiment, to operate an SSD adaptive profiling engine 410 for tracking SSD I/O operations directed to various LBA segments of memory and as to whether those SSD I/O operations are reads or writes. Tracking the SSD I/O operation accesses is used in determining LBA segment usage intensity levels for the types of SSD I/O accesses received from a host. The SSD adaptive profiling engine 410 may use this tracking the intensity levels of SSD I/O access types to establish optimized use of a RAM cache such as a DRAM 420 as described in embodiments herein. The SSD adaptive profiling engine 410 will determine whether to cache all or part of the FTL table in some embodiments. In some aspects, the SSD adaptive profiling engine 410 may additionally determine how much of a partial FTL table should be cached based on an anticipated data locality span and which LBA segments should have look-up addresses cached according to some embodiments. Additional details of algorithms describing the operation of the SSD adaptive profiling engine 410 according to various embodiments are discussed further herein.

Figure 5:
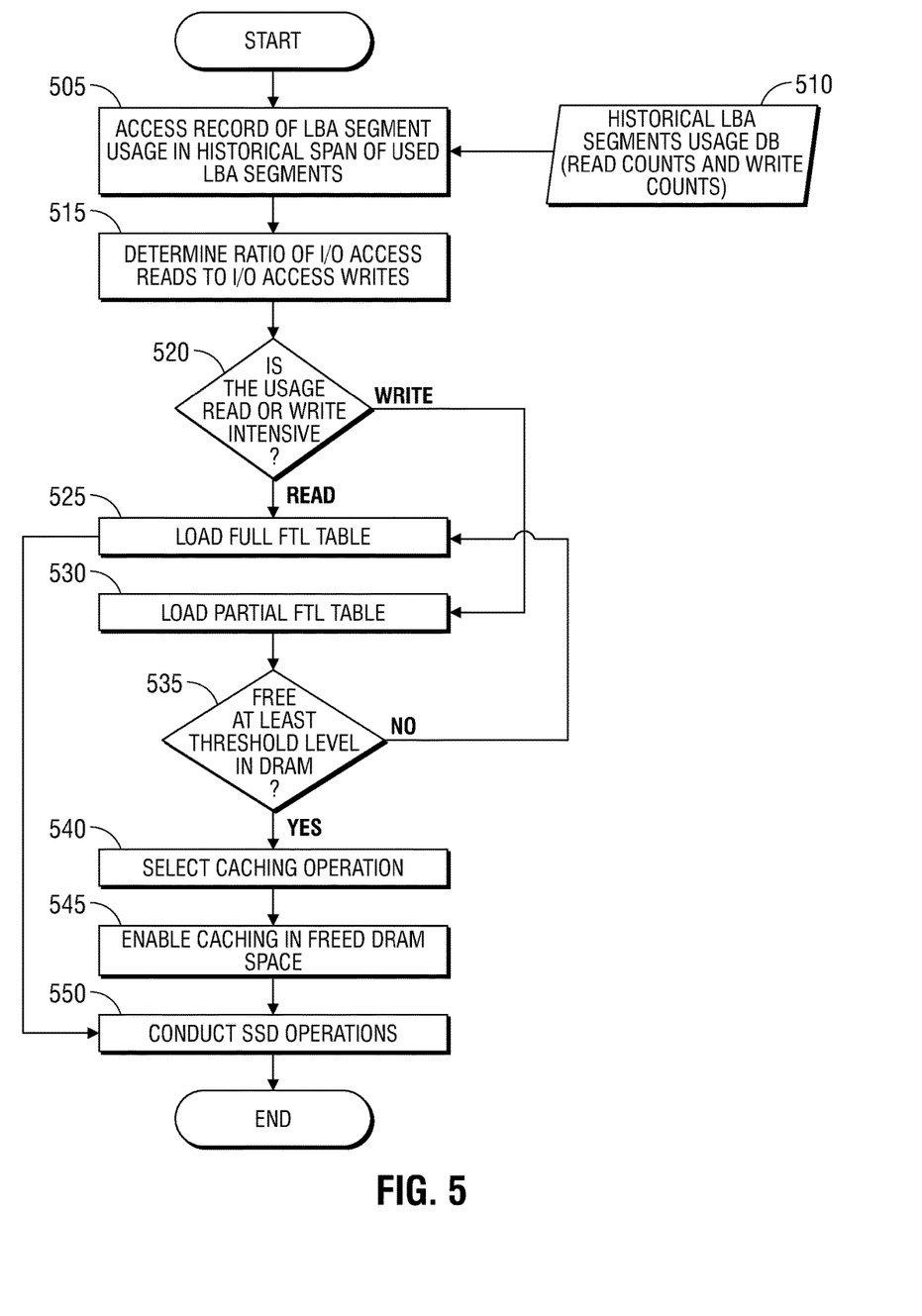
FIG. 5 is a flow diagram illustrating a method of operating the SSD adaptive profiling engine according to an embodiment of the present disclosure.

FIG. 5 is a flow chart showing an execution of code for an SSD adaptive profiling engine in determining whether to load a full FTL table into RAM cache or partial FTL table to optimize SSD memory device operation. Determination of the whether to load the full or partial FTL table may be made upon initialization or start-up of an SSD memory device with a host information handling system in some embodiments. In other embodiments, a determination may be made during operation. In such an embodiment, the adaptive profiling engine may dynamically or periodically switch from a fully loaded FTL table to a partial FTL table in cache or vice-versa.

In such embodiments where a change to the cached FTL table is made, during operation or otherwise, a number of triggers may be used for making such a change. In an aspect however, frequent toggling between full and partial FTL table arrangements in cache may be disruptive. Accordingly, the FTL table change triggers may be tuned to cause a change in FTL table caching when beneficial to optimize the SSD memory device function. The FTL table change triggers may include read LBA segment access counts or write LBA segment access counts or a ratio between the two reaching a certain threshold. Another change trigger may be the SSD controller encountering a partial FTL table cache miss or a threshold number of partial FTL table cache misses suggesting a need for an expanded FTL table or a full FTL table. Other FTL table change trigger events are contemplated in accordance with operation of an SSD memory device. Some of the change trigger events for determining a full or partial FTL table to be cached are discussed further herein.

Flow begins at 505 where the SSD controller may access the LBA segment use history database 510 to determine the number of I/O accesses that were SSD read I/O accesses or to determine the number that were SSD write I/O accesses. The historical LBA segments usage database is used to store LBA address access counts. In a further aspect of the present disclosure, in addition to recording the overall number of I/O operation access counts for each of the LBA addresses, the type of I/O access operations may also be recorded. Separate access counts may be kept for read I/O accesses and write I/O accesses.

Proceeding to 515, the SSD adaptive profiling engine may execute code to determine the ratio of I/O access counts that are read accesses to those that are write accesses. This ratio may be determined whereby the SSD controller, or other processor, executes code to assess the total number of read accesses to the total number of write accesses. In an embodiment, this will yield a ratio of read to write accesses. In some aspects of the present embodiment, the number of read accesses and write accesses may be assessed for the entire LBA segment address span associated with the physical SSD flash memory. In other aspects of the present embodiment, the number of read accesses and write accesses may be assessed for some subset of LBA segment addresses such as those in the historical data locality span of LBA segments. For example, the historical data locality span may reflect a most recently used set of LBA segment addresses such as those cached with the last partially cached FTL table. The historical data locality span reflects those LBA segment addresses that are more frequently accessed. In other aspects, the historical data locality span may include those LBA segment addresses that have ever recorded an access. Variations on determining the parameters of a historical data locality span for an SSD memory device may be determined in a variety ways as understood by those of skill. The historical data locality span may be determined according to embodiments described herein as well as according to embodiments described in the related application Ser. No. 15/273,573.

In other embodiments, the number of read accesses and write accesses may be assessed based on a period of time. For example, read and write access counts may only be assessed since a fixed period of time prior to the present operation of the SSD adaptive profiling engine. In another aspect, the number of read access counts and write access counts may be assessed based on a fixed number of SSD memory device startups or a fixed number of previous I/O accesses since the current SSD memory device operation. It is contemplated that any other limitations on the number of read accesses and write accesses assessed from the access counts in the historically useful LBA segments database may be applied in a determination of a ratio of read accesses to write accesses.

At 520, the SSD adaptive profiling engine determines whether the assessed ratio of read I/O accesses to write I/O accesses is intensive toward one or the other type. In other embodiments, the SSD adaptive profiling engine may determine whether or not the SSD memory device operation receives SSD I/O operations that reach a threshold number of write operations to be write intensive. To make such a determination, a threshold level of write I/O operations compared to the total number of I/O operations may be assessed. The threshold level for determination as write intensive operation may be a percentage level of counted write I/O operations to the total I/O operations counted. If the assessed SSD memory device operation is not deemed write intensive, it may then be deemed read intensive instead in some embodiments.

In an another embodiment, the SSD adaptive profiling engine at 520 may determine whether or not the SSD memory device operation receives SSD I/O operations that reach a threshold number of read operations to be read intensive. To make such a determination, a threshold level of read I/O operations compared to the total number of I/O operations may be assessed. The threshold level for determination as read intensive operation may be a percentage level of read I/O operations to the total I/O operations counted. If the assessed SSD memory device operation is not deemed read intensive, it then may be deemed write intensive at 520 in some embodiments.

In yet another embodiment, the SSD adaptive profiling engine may determine at 520 whether or not the SSD I/O operations weigh toward read I/O operations or write I/O operations beyond a threshold ratio level. This threshold ratio level between the read I/O operations and the write I/O operations may be the basis of determining write intensive function or read intensive function of the SSD memory device. To make such a determination, a threshold ratio level of write I/O operations compared to the total number of I/O operations may be assessed in one aspect. The threshold ratio level for write intensive operation may ratio of write I/O access counts to read I/O access counts recorded in another aspect. The ratio threshold level may be set at any level. In an example embodiment, the threshold ratio may be 50:50 such that if the ratio of counts of read accesses to write accesses is greater than 50:50, the SSD operation is deemed read intensive. Similarly, if the ratio of counts of write accesses to read accesses is greater than 50:50, the SSD operation is deemed write intensive. It can be appreciated that a ratio of 60:40 or any ratio besides 50:50 may be used in some embodiments instead. For example, 60:40 may be used so that the change in the behavior of the SSD memory device must change more drastically toward a read intensive or write intensive operation before the adaptive profiling engine makes changes to the FTL table and the cache system. This increased threshold ratio level may be used to avoid frequent switching of the FTL table caching strategy employed by the SSD controller to avoid disruption of operation or be costly in controller processing resources. It can be appreciated that different threshold ratio levels may also be used when transitioning from an existing read intensive cache strategy to a write intensive cache strategy than the threshold ratio level used to transition in the reverse direction. For example in one embodiment, if a write intensive cache strategy is detected, a determination of a ratio of read I/O accesses above 50% or 50:50 may transition to a read intensive cache strategy. However, if a read intensive cache strategy is detected as operating, then a determination of a ratio of write I/O accesses above 60% or 60:40 may be a threshold for transition to the write intensive cache strategy. It is understood that any percentage threshold or threshold ratio level of determined read I/O access counts or write access counts may be used in accordance with a design strategy for the operation of the adaptive profiling engine of the present disclosure. The present embodiment is not intended to limit the percentage threshold or threshold ratio levels selected.

If a read intensive operation is determined, then flow proceeds to 525. At 525, the adaptive profiling engine determines to load a full FTL table into RAM cache. For read intensive operation, the SSD controller does not have control over which LBA addresses are incoming from the host device. Thus, to avoid FTL table cache miss delays in swapping out LBA look-up address entries from SSD flash memory where the entire FTL table is stored, the full FTL table may be cached in RAM. In this way, efficient and responsive operation of the SSD memory device is ensured when I/O operations are determined to be read intensive. Flow proceeds to 550 where the SSD memory device and SSD controller will conduct normal operations including the LBA address translation to perform incoming I/O operations. With read intensive operation, the address translation will interpret an incoming LBA address to retrieve data from physical locations in SSD flash memory. Then this data may be reported back to the requesting host device.

If a write intensive operation is determined, then flow proceeds to 530. At 530, the adaptive profiling engine determines to load a partial FTL table into RAM cache. For write intensive operation, the SSD controller does have some control over where to write incoming I/O operations from the host device. The SSD controller may elect to write incoming I/O write operations to a narrower data locality span than the entire SSD flash memory. Thus, a partial FTL table may be cached with a lower risk of FTL table cache misses causing delays to require swapping out LBA look-up address entries from SSD flash memory. In this way, the adaptive profiling engine may free up a remainder of the DRAM and use it for other operations to enhance the efficiency and responsiveness of the SSD memory device when I/O operations are determined to be write intensive. The flow may proceed to 535 where the adaptive profiling engine may determine how much of the DRAM data cache has been freed. In one embodiment, if the data locality span requires a large enough partial FTL table such that only a small amount of DRAM is freed, the risk of a FTL table cache miss may not be sufficient to justify operating a data cache. A threshold level of RAM may need to be made available at 535 for the adaptive profiling engine to proceed to implement the data cache for SSD memory device operation enhancement. For example, if less than 200 MB of RAM has been freed, then the size of the data cache available for enhancing SSD operation may not be large enough. In such an embodiment, flow may return to 525 where a full FTL table is loaded into cache. Risk of an FTL table cache miss is eliminated and flow proceeds to 550 where the SSD memory device and SSD controller will conduct normal operations of the SSD memory device.

If at 535, there is a sufficient level of RAM freed up by use of a partial FTL table, then flow proceeds to 540. At 540, the adaptive profiling engine will select a caching operation to use with the freed RAM cache space made available by loading only a partial FTL table into the RAM cache. The unused portion of RAM may be used for data caching to enhance efficiency or responsiveness of the SSD flash memory device to the host system. Proceeding to 545, the adaptive profiling engine will enable use of the unused RAM space for caching. This use will be in accordance with the selected caching operation. For example, the adaptive profiling engine may implement a write caching operation to enhance responsiveness of the SD memory device to a host during write I/O operations. An example embodiment of write caching is described in more detail herein such as below with FIG. 7. In another example embodiment, the adaptive profiling engine may implement a pre-fetch operation for read operations in accordance with descriptions in related application Ser. No. 15/273,573. A pre-fetching operation may use address look-ahead hints to predict data from anticipated flash memory locations associated with anticipated LBA address requests to pre-fetch data from the NAND flash and store in the more responsive RAM cache memory. Other data caching operations may be used in accordance with the SSD memory device operations as understood by those of skill in the art as well. Flow then proceeds to 550 where the SSD memory device and SSD controller will conduct normal operations of the SSD memory device for read I/O operations, write I/O operations, addressing, wear balancing, buffering, and the like.

It should be understood that the method recited above may occur in any order and aspects may occur simultaneously. Moreover, certain steps of the method not recited or recited in other example embodiments herein may be combined and conducted as understood by those of skill. Further, not all aspects of the method of FIG. 5 need to be performed in all embodiments contemplated. For example, conducting pending SSD operations at 550, such as other I/O operations, need not necessarily wait for other steps to be performed of adaptive profiling and may instead operate simultaneously or may occur before operations of the adaptive profiling engine occur as described in the several embodiments described herein.

In an aspect of the present disclosure, adaptive profiling is conducted during operations at least in part via execution of a code algorithm by the SSD controller. These adaptive profiling code algorithms are prepared along with the SSD and SSD controller in firmware or hard coded wiring in some embodiments. The SSD memory device and SSD controller may be initialized when they are powered up with activation of a host information handling system in some embodiments. At such a time, the adaptive profiling engine may be initialized in preparation for conducting adaptive profiling operations.

Figure 6:
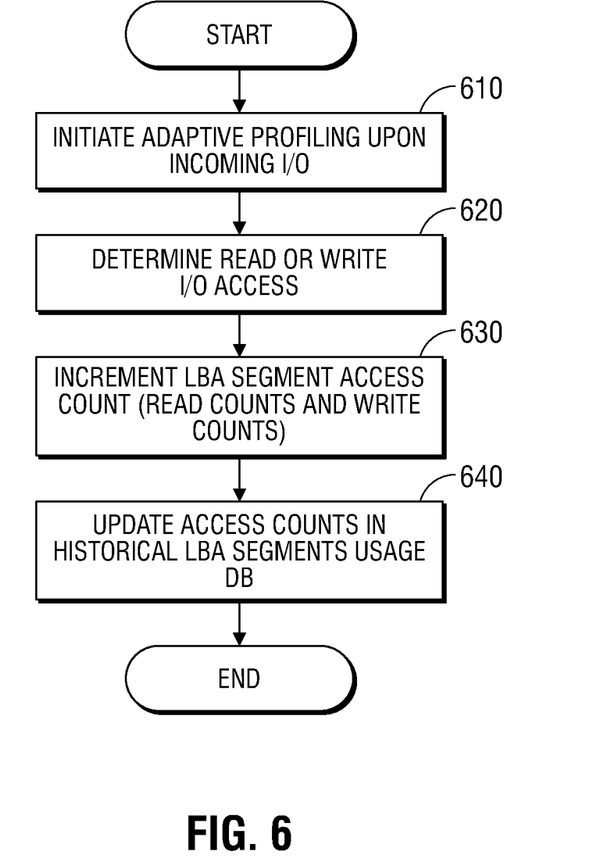
FIG. 6 is a flow diagram illustrating another method of operating the SSD drive with profiling according to an embodiment of the present disclosure.

FIG. 6 is a flow chart showing operation of the SSD adaptive profiling engine to track I/O operations incoming from one or more host devices. In an aspect, the SSD adaptive profiling engine tracks I/O accesses to LBA segments and stores this information in the historically useful LBA segments database information. At 610, the SSD controller may initiate the adaptive profiling engine upon receipt of an incoming I/O operation from a host. Proceeding to 620, the SSD controller determines the type of access received from the host. Additionally, the SSD controller may record to which LBA address the I/O operation is directed. In particular, the SSD controller determines and records whether the incoming I/O operation is a read or write operation.

At 630, the adaptive profiling engine will increment LBA segment access counts. Further, the adaptive profiling engine may increment a count of total read I/O accesses and I/O write accesses. These LBA segment access counts will be updated and stored in the historical LBA segments usage database. For each of the LBA segment access counts, metadata may record whether the I/O access is either a read or write access. At 640, such a count of read I/O accesses and write I/O accesses may be updated and stored periodically in the historical LBA segments usage database in some embodiments. Further, other data may be recorded including a total number of I/O accesses received, timestamp data for incoming I/O accesses, indication of whether LBA addresses subject to I/O accesses fell within an historical data locality span, and other information related to access count data. If more than one host were accessing the SSD memory device, which host sent the I/O access operation may also be recorded. It can be appreciated that other types of data relating to the SSD I/O operations may also be recorded as well. At this point the process may end.

It should be understood that the method recited above may occur in any order and some aspects may occur simultaneously. Moreover, certain steps of the method not recited or recited in other example embodiments herein may be combined and conducted as understood by those of skill. Further, not all aspects of the method of FIG. 6 need to be performed in all embodiments.

Figure 7:
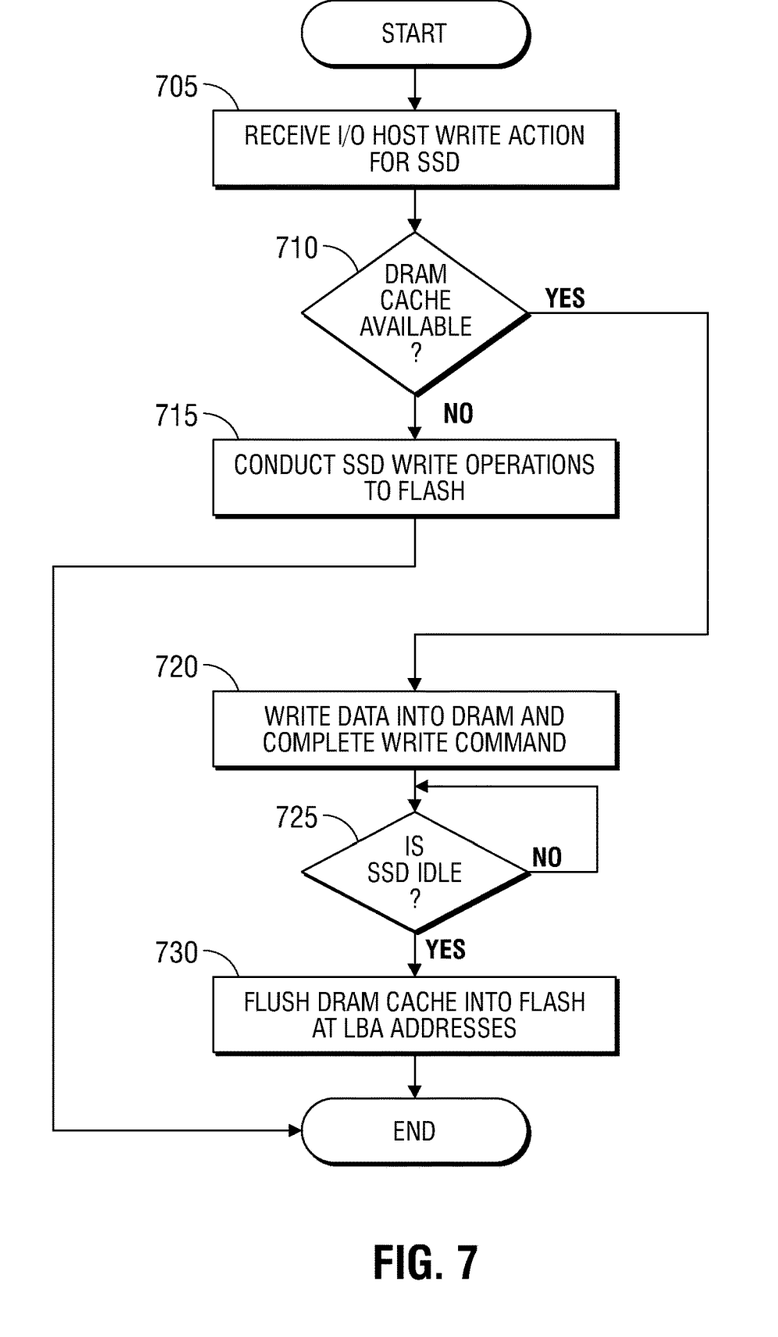
FIG. 7 is a flow diagram illustrating yet another method of operating the SSD drive with profiling according to an embodiment of the present disclosure.

FIG. 7 is a flow chart showing operation of the SSD adaptive profiling engine to conduct I/O write operations and utilize write caching if available according to an aspect of the present disclosure. In an example embodiment, the SSD memory device and SSD controller will receive an incoming I/O operation from a host device at 705. Proceeding to 710, the SSD controller will determine whether RAM cache has been made available for data caching. In other words, the SSD controller determines whether a partial FTL table loaded into RAM freeing a portion of the RAM cache for write caching. As described in embodiments above, if a partial FTL table is loaded and a remainder RAM space is available for data caching may be determined according to various embodiments described herein.

If no RAM space is available for write caching, then flow proceeds to 715 where the SSD controller will conduct the SSD write operations to flash memory. As explained, an LBA address may be selected and a corresponding physical flash memory location. The SSD controller will execute a program write to the physical location of the flash memory, update the FTL table as necessary, and report the program write as completed upon writing to the flash memory. At this point, the process may end.

If the RAM space is available for write caching, then flow proceeds to 720 where the SSD controller may execute a write caching subsystem to implement write caching. At 720, the write caching subsystem will write data into the RAM cache space allocated for write caching. Upon doing so, the SSD controller may then respond to the host device that the program write operation has been completed. Since writing to RAM is faster than a full program write operation to a physical flash location, the responsiveness of the SSD memory device to the host device is improved. Flow then proceeds to 725 where the write caching subsystem will monitor the ongoing activity of the SSD memory device. If the SSD memory device is not idle, the write caching subsystem continues to monitor the SSD memory device activity until a period of idleness is detected.

When the SSD memory device is determined to be idle at 725, flow proceeds to 730 where the write caching subsystem will flush the program write data stored in the DRAM cache into the physical flash memory at the locations associated with the indicated LBA segment address or addresses for the cached program write operations. The portion of RAM cache used to store the received program write I/O data may then be erased for a future write caching operation pursuant to the above. At this point, the process may end.

As previously stated, it should be understood that the method recited above may occur in any order or some aspects may occur simultaneously. Moreover, certain steps of the method not recited or recited in other example embodiments herein may be combined and conducted as understood by those of skill. Further, not all aspects of the method of FIG. 7 need to be performed in all embodiments contemplated.

While embodiments have been described herein with respect to specific types SSD controller activity and performance, other embodiments may be applied and include additional SSD controller activity relating to SSD read or write operation enhancements and function of the SSD to avoid failures in SSD cells or data. For example, if it is desirable to provide other or additional types of SSD function enhancements or caching, an embodiment using such other or additional types of function enhancements or caching may be implemented in accordance with the disclosure herein. For example, some SSD controller systems have on-board SRAM. This SRAM may be used for caching instead of the DRAM utilized in the example embodiments. Further, it is contemplated that any DRAM, SRAM or other RAM memory, whether on-board the SSD controller or distinct from but operatively connected to the SSD controller may be used for caching. In the methods described herein a flow of method steps is depicted, however it is understood that one or more of the steps may be formed in any order and some steps may be performed simultaneously. It is also understood that in some embodiments not all steps may be performed or additional steps may be added as understood by those of skill in the art. Finally, it is understood that one or more steps from each of the method embodiments disclosed may be combined in various ways to provide combination embodiments.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a solid state drive (SSD) memory device;
    an SSD controller executing instructions of an SSD adaptive profiling engine for random access memory (RAM) cache optimization;
    the SSD adaptive profiling engine determining whether the SSD memory device operation is write intensive from assessment of stored write accesses as recorded in logical block address (LBA) segment access counts;
    a RAM cache to be used for caching purposes with the SSD memory device;
    the SSD controller caching a partial flash transition layer (FTL) table in RAM when the SSD memory device operation is determined to be write intensive; and
    the SSD controller establishing a cache in RAM space unoccupied by the partial FTL table to enhance SSD memory device operation.

2. The information handling system of claim 1 further comprising:
    the SSD controller caching a full FTL table in RAM including look-up addresses corresponding to LBA segments in the flash memory when the SSD memory device operation is determined to not be write intensive.

3. The information handling system of claim 1 wherein a threshold level for determining write intensive operation is a ratio of greater than 50% of all incoming SSD I/O operation accesses are write accesses as recorded in the LBA segment access counts.

4. The information handling system of claim 1 wherein a threshold level for determining write intensive operation is a ratio of greater than 60% of all incoming SSD I/O operation accesses are write accesses as recorded in the LBA segment access counts.

5. The information handling system of claim 1 further comprising:
    the SSD controller determining the SSD memory device operation is read intensive from assessment of stored read access counts; and
    the SSD controller caching a full FTL table in RAM including look-up addresses corresponding to LBA segments in the NAND flash memory when the SSD memory device operation is determined to be read intensive.

6. The information handling system of claim 1 further comprising:
    the SSD controller utilizing the RAM space unoccupied by the partial FTL table for write caching.

7. The information handling system of claim 6 further comprising:
    the SSD controller receiving an incoming write I/O operation from a host;
    the SSD controller writing the incoming write I/O operation data to the write cache in RAM;
    the SSD controller responding to the host that the write I/O operation is complete; and
    the SSD controller flushing the write cache to flash memory location corresponding to write I/O data LBA address upon determining that the SSD memory device is idle.

8. A computerized method of RAM cache optimization for a solid state drive (SSD) memory device comprising:
    executing instructions, via an SSD controller, of an SSD adaptive profiling engine for RAM cache optimization to determine whether SSD memory device operation is read intensive based on tracking read access counts to LBA segment addresses as recorded in LBA segment access counts;
    caching in a RAM a partial FTL table including look-up addresses corresponding to LBA segments in NAND flash memory when the SSD memory device operation is determined not to be read intensive; and
    establishing a data cache in RAM space unoccupied by the partial FTL table to enhance SSD memory device responsiveness.

9. The computerized method of claim 8 further comprising:
    caching in the RAM a full FTL table including look-up addresses corresponding to LBA segments in the NAND flash memory when the SSD memory device operation is determined to be read intensive.

10. The computerized method of claim 8 wherein a threshold level for determining read intensive operation is a ratio of greater than 50% of all incoming SSD I/O operation accesses are read accesses as recorded in the LBA segment access counts.

11. The computerized method of claim 8 wherein a threshold level for determining read intensive operation is a ratio of greater than 60% of all incoming SSD I/O operation accesses are read accesses as recorded in the LBA segment access counts.

12. The computerized method of claim 8 further comprising:
utilizing the RAM space unoccupied by the partial FTL table for write caching.

13. The computerized method of claim 12 further comprising:
upon receiving a next incoming write I/O operation from a host, writing the incoming write I/O operation data to the write cache in RAM;
completing the write I/O operation.

14. The information handling system of claim 13 further comprising:
upon determining that the SSD memory device is idle, flushing the write cache to one or more flash memory locations corresponding to a write I/O data LBA address.

15. An information handling system comprising:
a solid state drive (SSD) memory device;
an SSD controller executing instructions of an SSD adaptive profiling engine for random access memory (RAM) cache optimization;
the SSD adaptive profiling engine determining whether the SSD memory device operation is write intensive or read intensive from assessment of stored LBA address read access counts and LBA address write access counts;
a RAM cache to be used for caching purposes with the SSD memory device;
the SSD controller caching a partial flash transition layer (FTL) table in RAM when the SSD memory device operation is determined to be write intensive and establishing a write cache in RAM space unoccupied by the partial FTL table; and
the SSD controller caching a full FTL table in RAM when the SSD memory device operation is determined to be read intensive.

16. The information handling system of claim 15 wherein the data cache in RAM space unoccupied by the partial FTL table is used as a write cache when the SSD memory device operation is determined to be write intensive.

17. The information handling system of claim 15 wherein a threshold level for determining whether SSD memory device operation is read intensive or write intensive when either the LBA address read access counts or the LBA address write access counts are greater than 50% of all incoming SSD I/O operation accesses.

18. The information handling system of claim 15 wherein a threshold level for determining whether SSD memory device operation is read intensive or write intensive to trigger a change in FTL table size when either the read I/O access counts or the write I/O access counts greater than 65% of all incoming SSD I/O operation accesses.

19. The information handling system of claim 15 further comprising:
the SSD controller determining the SSD memory device operation is write intensive and caching a partial FTL table;
the SSD controller receiving an incoming write I/O operation from a host and writing the incoming write I/O operation data to the write cache in RAM; and
the SSD controller responding to the host that the write I/O operation is complete.

20. The information handling system of claim 19 further comprising:
the SSD controller flushing the write cache to flash memory corresponding to write I/O data LBA addressing upon determining that the SSD memory device is idle.

* * * * *